Dec. 5, 1944.  R. O. ANDERSON  2,364,042
AERIAL PICKUP DEVICE
Filed April 3, 1943  2 Sheets-Sheet 2
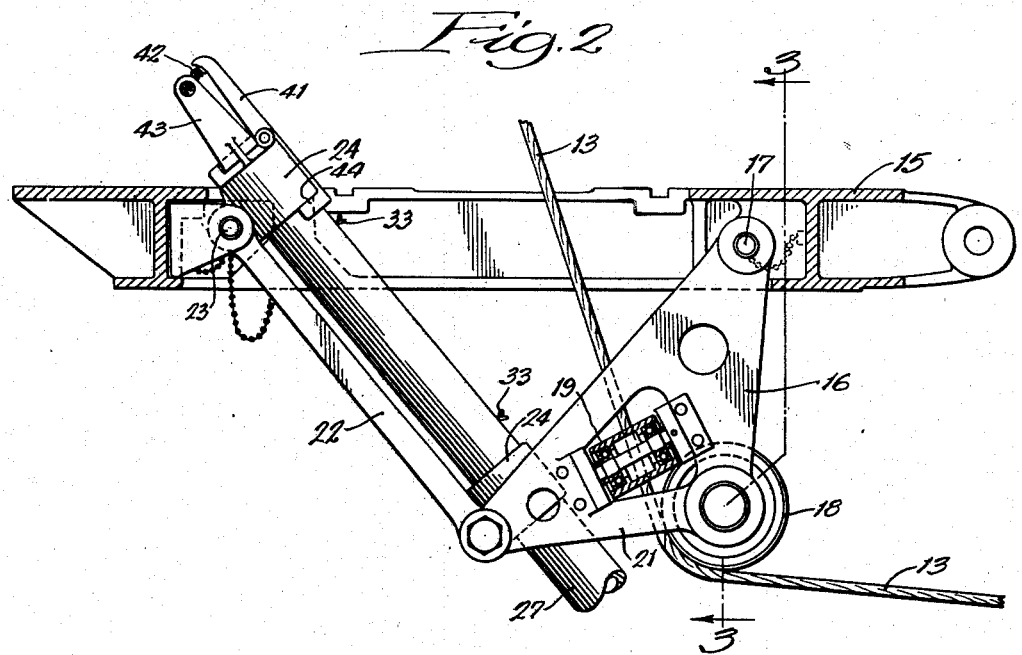
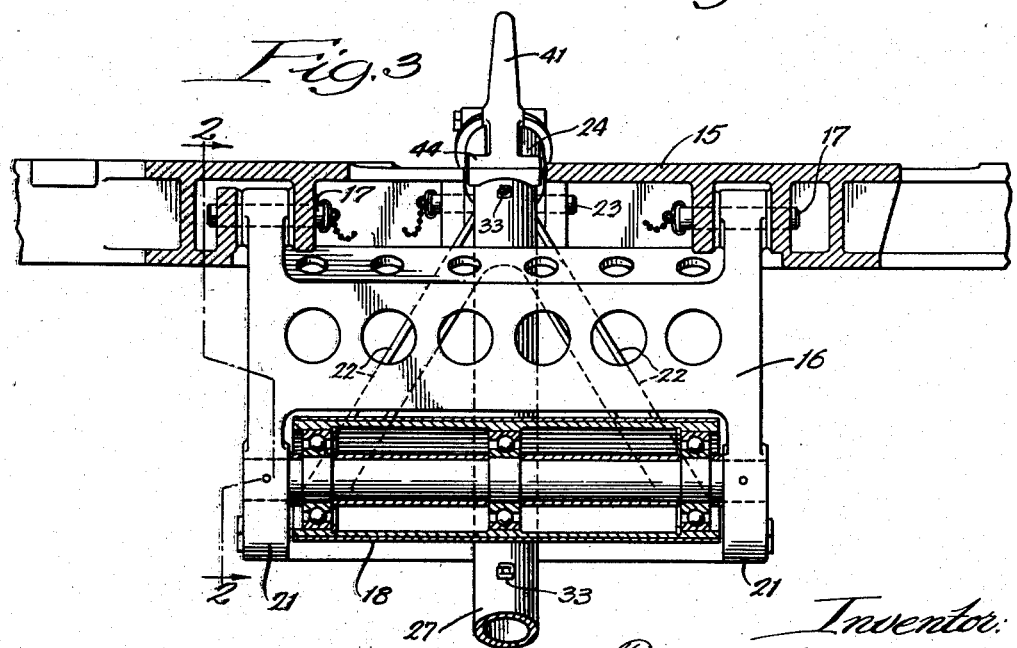
Inventor:
Rexford O. Anderson,
By Dawson, Ornis & Bott,
Attorneys.

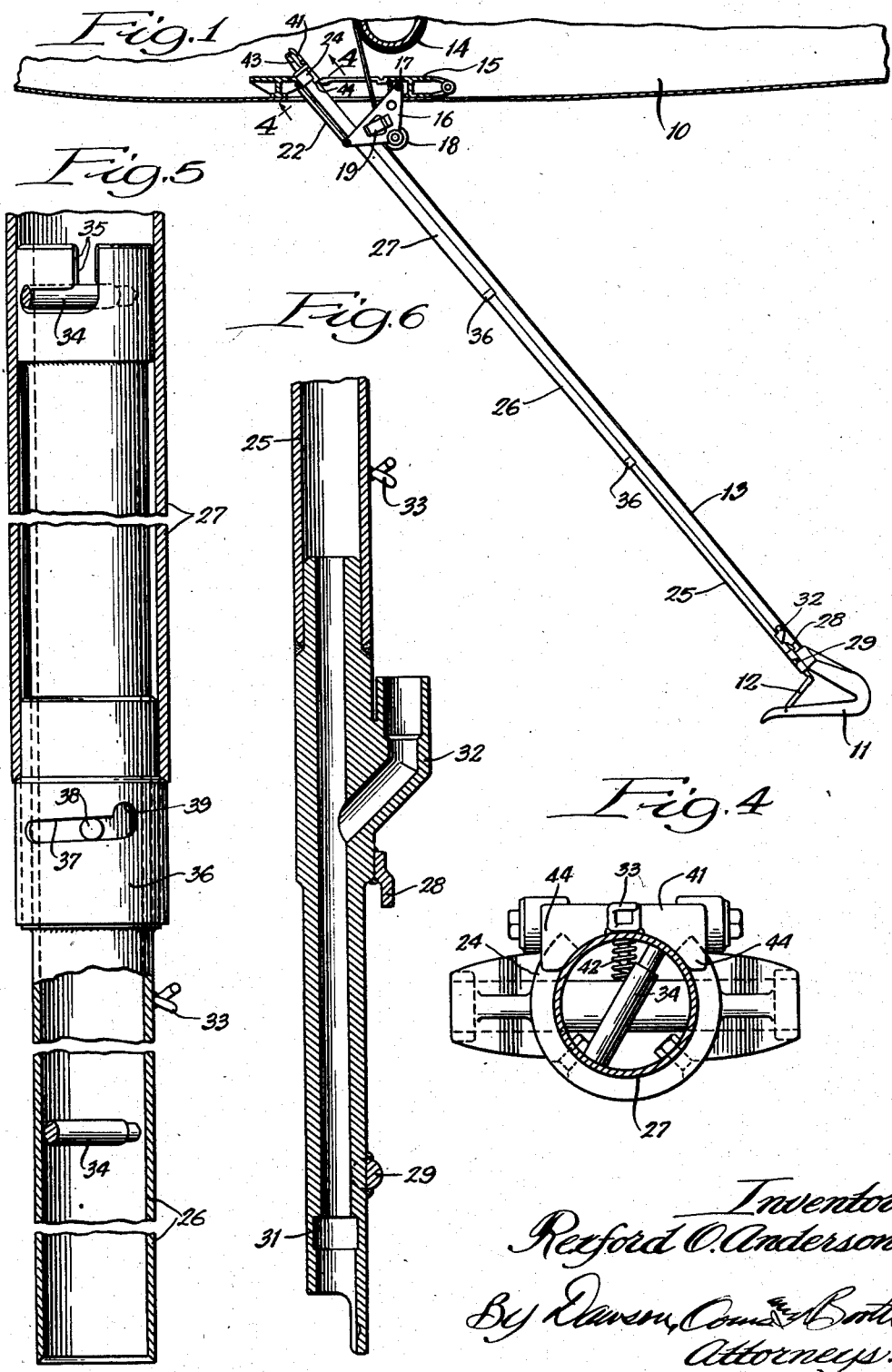

Patented Dec. 5, 1944

2,364,042

UNITED STATES PATENT OFFICE 2,364,042

AERIAL PICKUP DEVICE

Rexford O. Anderson, Chicago, Ill., assignor to Foote Bros. Gear and Machine Corporation, Chicago, Ill., a corporation of Delaware Application April 3, 1943, Serial No. 481,712

10 Claims. (Cl. 258—1.2)

This invention relates to an aerial pickup device and more particularly to a support and guide structure adapted to be mounted in an aircraft for supporting a pickup hook and guiding a cable connected to the hook.

One of the objects of the invention is to provide an aerial pickup device including a cable guide structure retractable into the carrying plane and extensible beyond the plane to guide a tow cable.

Another object of the invention is to provide a support and guide structure for aerial pickup devices formed by pivotally interconnected parts which provide a rigid construction projecting out of the plane in use and which may be readily retracted into the plane.

Another object of the invention is to provide an aerial pickup device in which a retractable frame serves both to guide a cable and to carry an elongated support on which a hook may be detachably mounted. Still another object of the invention is to provide an elongated hook carrying support for an aerial pickup device which is formed in detachably connected sections. One feature of the invention relates to a joint construction for holding the sections rigidly together in a predetermined angular position.

A further object of the invention is to provide an aerial pickup device in which the hook carrying support is adapted to carry a control device actuated by engagement of the hook with a load.

The above and other objects and advantages of the invention will be more readily apparent from the following description when read in connection with the accompanying drawings, in which—

Figure 1 is a side elevation with parts in a section of an aerial pickup device embodying the invention;

Figure 2 is an enlarged partial view similar to Figure 1 on the line 2—2 of Figure 3;

Figure 3 is a section on the broken line 3—3 of Figure 2;

Figure 4 is a partial section on the line 4—4 of Figure 1;

Figure 5 is an enlarged partial section of the support showing a joint construction; and Figure 6 is an enlarged partial section of the outer end of the support.

An aerial pickup device of the type to which the present invention relates is adapted to be carried by an airplane indicated at 10 in Figure 1 and to carry a hook 11 for engagement with a loop connected to a load to be picked up by the aircraft. The hook 11 may be of the type more particularly described and claimed in my copending application, Serial No. 481,711, filed April 3, 1943, and as shown includes a pivoted keeper 12 for engagement with a support to hold the hook detachably thereon and to operate a control device. The hook is connected to a cable 13 carried by a reel 14 in the airplane. The reel may be constructed as more particularly described and claimed in the copending application of Mackmann and Ardussi, Serial No. 481,736, filed April 3, 1943, and may be controlled in accordance with the copending application of Ardussi, Anderson and Landry, Serial No. 483,078, filed April 14, 1943.

The reel is adapted to be supported by a base 15 rigidly mounted in the aircraft and having an opening therein registering with an opening in the bottom of the aircraft. The base 15 may support the reel 14 and its associated mechanism and also forms a part of the guide and support structure forming the subject matter of the present invention.

In order to guide the cable to hold it away from the aircraft during operation an arm 16 is pivoted to the base 15 by means of removable pins 17. The arm carries a transverse roller 18 under which the cable 13 passes and preferably has a pair of side rollers 19 to limit side movement of the cable on the roller 18. The arm 16 has a pair of side extensions 21 providing a space through which the cable may pass and which are pivoted at their ends to a V-shaped link 22. The link 22 is detachably connected to the base 15 by a removable pin 23 at its upper end. With this construction removal of either pin 23 or pins 17 will permit the link and arms to be pulled up through the opening in the base 15 to retracted position in the aircraft. When, however, the pins are all in place, an extremely rigid structure is provided holding the guide rollers 18 and 19 in proper guiding position below the outline of the aircraft.

The hook 11 is adapted to be carried by an elongated support mounted in the plane to project therefrom and for this purpose the link 22 carries adjacent its opposite ends sleeves 24 providing detachable mounting means for the support. The sleeves are split at their upper ends to provide openings as best seen in Figure 4 which are less than half of the sleeve so that the support will be properly held thereby.

According to the present invention, the support for the hook 11 is made in a plurality of sections interconnected end-to-end, three such sections 25, 26 and 27 being shown. The outer end section 25 is of smaller diameter than the other sections and is formed at its end with an offset piece 28 and with a cross member 29 forming a part of the means for securing the hook 11 thereto. As shown, the outer end of the section 25 is hollow providing a cavity 31 in which a control device such as an electric switch may be mounted. Wires connected to the switch may pass through a hollow boss 32 on the side of section 25 communicating with the hollow interior thereof. The wires may be held in place on the support by guides 33 secured to the several sections so that the wires may be inserted in and removed from the guides as desired.

The several sections are connected together by joints as shown in Figure 5. As shown in this figure, the several sections are tubular and of a progressively increasing size so that the end of one section will telescope into the end of the next larger section. The larger sections carry adjacent their outer ends cross pins 34 shaped as best seen in Figure 4 to provide end portions of different sizes. These pins are adapted to cooperate with bayonet slots 35 in the outer end of the smaller section, the slots 35 being of different sizes so that the sections can be put together in only one relatively angular position.

In order to hold the bayonet joints against loosening the smaller section adjacent a joint carries a cam ring 36 formed in its opposite sides with angular slots 37 slidably interfitting with pins 38 on the smaller section. Each slot 37 terminates at one end in an axially extending portion 39 extending toward the adjacent end of the section.

In connecting two sections together, the cam ring 36 is turned until the pins 38 are in the extensions 39 and the end of the section is then telescoped into the adjacent section with the slots 35 fitting over the pins 34 and is turned to make the bayonet connection. The cam ring 36 is then turned to engage the end of the adjacent large section and to exert pressure thereon so that the pins 34 will be held against moving out of the slots 35. With this construction an extremely rigid joint is provided.

In placing the support in the mounting sleeves 24 the end section 25 with the hook attached is passed through the space between the extensions 21 on arm 16 and is then dropped through the openings in the top of the sleeves. Preferably the section 25 is made slightly smaller than the openings in the sleeves so that this can be done and the other sections are of greater diameter than the openings so that they will be held against movement out of the sleeves but will be slidably supported therein. The sections may be progressively slid through the sleeves being connected together inside of the aircraft as this is done until the end of the upper and largest section is substantially even with the top sleeve 24.

In order to hold the support in its fully extended position, a latch is provided shown as comprising a pivot lever 41 pivoted intermediate its ends on the upper section of the support and urged in a clockwise direction as seen in Figure 2 by a spring 42. The spring acts between the end of the latch lever and a handle extension 43 on the support section by which the support section may be moved. At its opposite end the lever fits into the opening in the upper sleeve 24 to hold the support against turning relative to the sleeve and has a pair of extending ears 44 on its opposite sides to engage the forward surface of the sleeve. Thus when the latch is raised to pass over the sleeve 24 and is released to move into the position shown in Figures 2 and 4 it will hold the support against longitudinal movement or turning movement in the sleeves.

While one embodiment of the invention has been shown and described in detail, it will be understood that this is illustrative only and is not intended as a definition of the scope of the invention, reference being had for this purpose to the appended claims.

What is claimed is:

1. In an aerial pickup device, the combination of a base having a central opening therein, arm and link members pivotally interconnected at one end, means connecting the other ends of the members to the base adjacent the opposite ends of the opening, a guide roller carried by one of the members to guide a cable passing through the opening in the base, and an elongated support carried by the other member projecting at one end through the opening in the base and extending beyond the pivotal connection between the members.

2. In an aerial pickup device, the combination of a base having a central opening therein, arm and link members pivotally interconnected at one end, means connecting the other ends of the members to the base adjacent the opposite ends of the opening, a guide roller carried by one of the members to guide a cable passing through the opening in the base, and means on the other member for detachably mounting an elongated support.

3. In an aerial pickup device, the combination of a base having a central opening therein, arm and link members pivotally interconnected at one end, means connecting the other ends of the members to the base adjacent the opposite ends of the opening, a guide roller carried by one of the members to guide a cable passing through the opening in the base, and supporting sleeves carried by the other member adjacent its ends to carry an elongated support.

4. In an aerial pickup device, the combination of a base having a central opening therein, arm and link members pivotally interconnected at one end, means connecting the other ends of the members to the base adjacent the opposite ends of the opening, a guide roller carried by one of the members to guide a cable passing through the opening in the base, mounting means on the other member, an elongated sectional support including a plurality of detachably connected sections slidably carried by the mounting means, and a latch carried by the base and engageable with the support to hold the support against sliding movement in the mounting means.

5. In an aerial pickup device, the combination of a base having a central opening therein, arm and link members pivotally interconnected at one end, means connecting the other ends of the members to the base adjacent the opposite ends of the opening, a guide roller carried by one of the members to guide a cable passing through the opening in the base, spaced mounting sleeves carried by the other member each having an opening in one side, a sectional support including an end section of a size to pass through the openings in the sleeves and other sections of a size slidably to fit in the sleeves, and a latch carried by the base and engageable with the support to hold the support against sliding movement in the sleeves.

6. In an aerial pickup device, the combination of a base having a central opening therein, arm and link members pivotally interconnected at one end, means connecting the other ends of the members to the base adjacent the opposite ends of the opening, a guide roller carried by one of the members to guide a cable passing through the opening in the base, spaced mounting sleeves carried by the other member each having an opening in one side, a sectional support including an end section of a size to pass through the openings in the sleeves and other sections of a size slidably to fit in the sleeves, and a latch carried by the support engageable with one of the sleeves to hold the support against sliding and turning in the sleeves.

7. In an aerial pickup device, the combination of a base having a central opening therein, arm and link members pivotally interconnected at one end, means connecting the other ends of the members to the base adjacent the opposite ends of the opening, a guide roller carried by one of the members to guide a cable passing through the opening in the base, spaced mounting sleeves carried by the other member each having an opening in one side, a sectional support including an end section of a size to pass through the openings in the sleeves and other sections of a size slidably to fit in the sleeves, a hook connected to the cable, and means on said end section detachably to support the hook thereon.

8. In an aerial pickup device, a support comprising a plurality of elongated tubular sections of different sizes to telescope together at their ends, means on the smallest end section detachably to support a hook thereon, and joints between adjacent sections each including a pin in the larger section to fit in bayonet slots in the end of the smaller section and a cam ring on the smaller section to engage the end of the larger section to lock the bayonet connection.

9. In an aerial pickup device a support comprising a plurality of elongated tubular sections of different sizes to telescope together at their ends, means on the smallest end section detachably to support a hook thereon, a latch on the largest end section to hold it in a support, and joints between adjacent sections each including a pin in the larger section to fit in bayonet slots in the end of the smaller section and a cam ring on the smaller section to engage the end of the larger section to lock the bayonet connection.

10. In an aerial pickup device, a support comprising a plurality of elongated tubular sections of different sizes to telescope together at their ends, means on the smallest end section detachably to support a hook thereon, latch means on the largest end section to hold it against turning in a support, and joints between adjacent sections each including a pin extending diametrically across the larger section and of different sizes at its ends, the end of the smaller section being formed with bayonet slots of different sizes to fit over the ends of the pin respectively whereby the sections can be assembled in only one relative angular position, and a cam ring on the smaller section engaging the end of the larger section to lock the bayonet connection.

REXFORD O. ANDERSON.